July 7, 1942.    L. S. WILLIAMS    2,288,761
PRINTING SCALE
Filed June 1, 1938    5 Sheets-Sheet 2
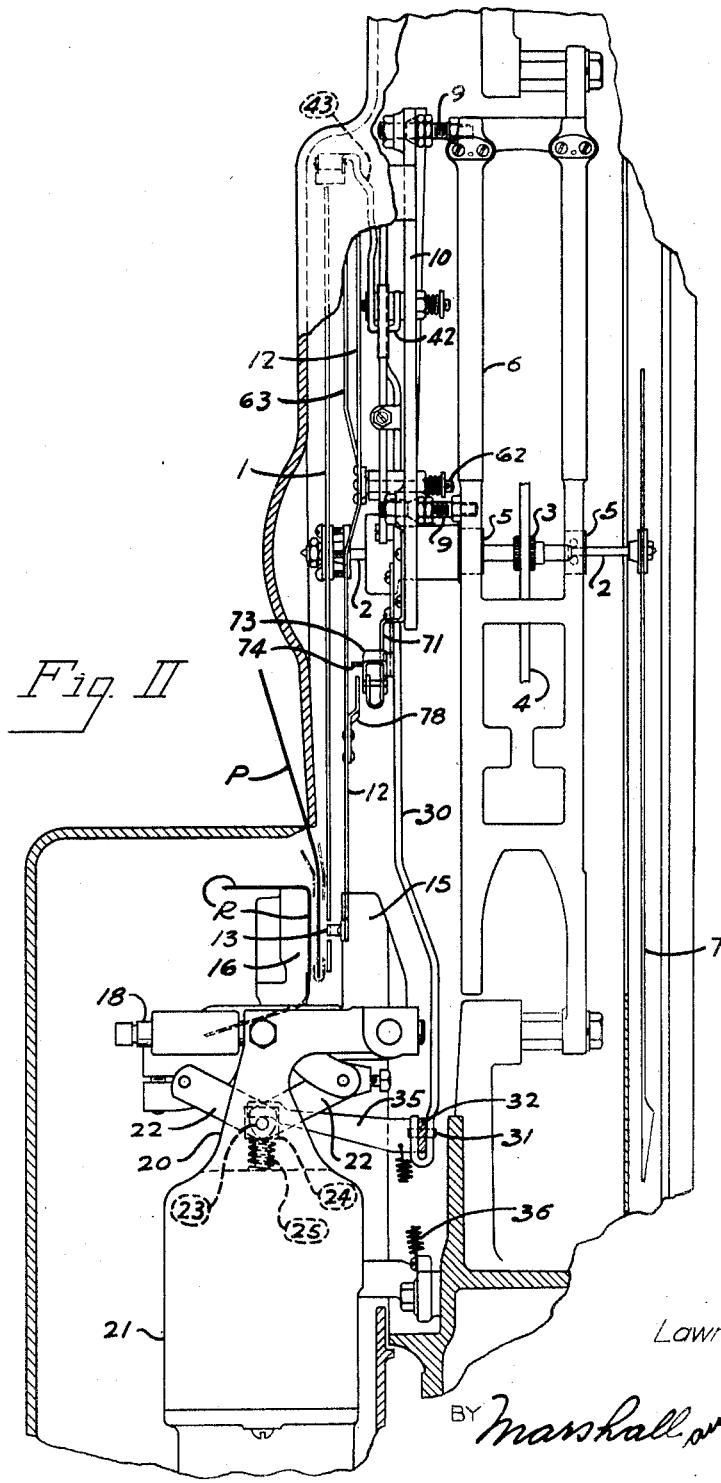
Fig. II
Lawrence S. Williams
INVENTOR
BY Marshall and Marshall
ATTORNEYS

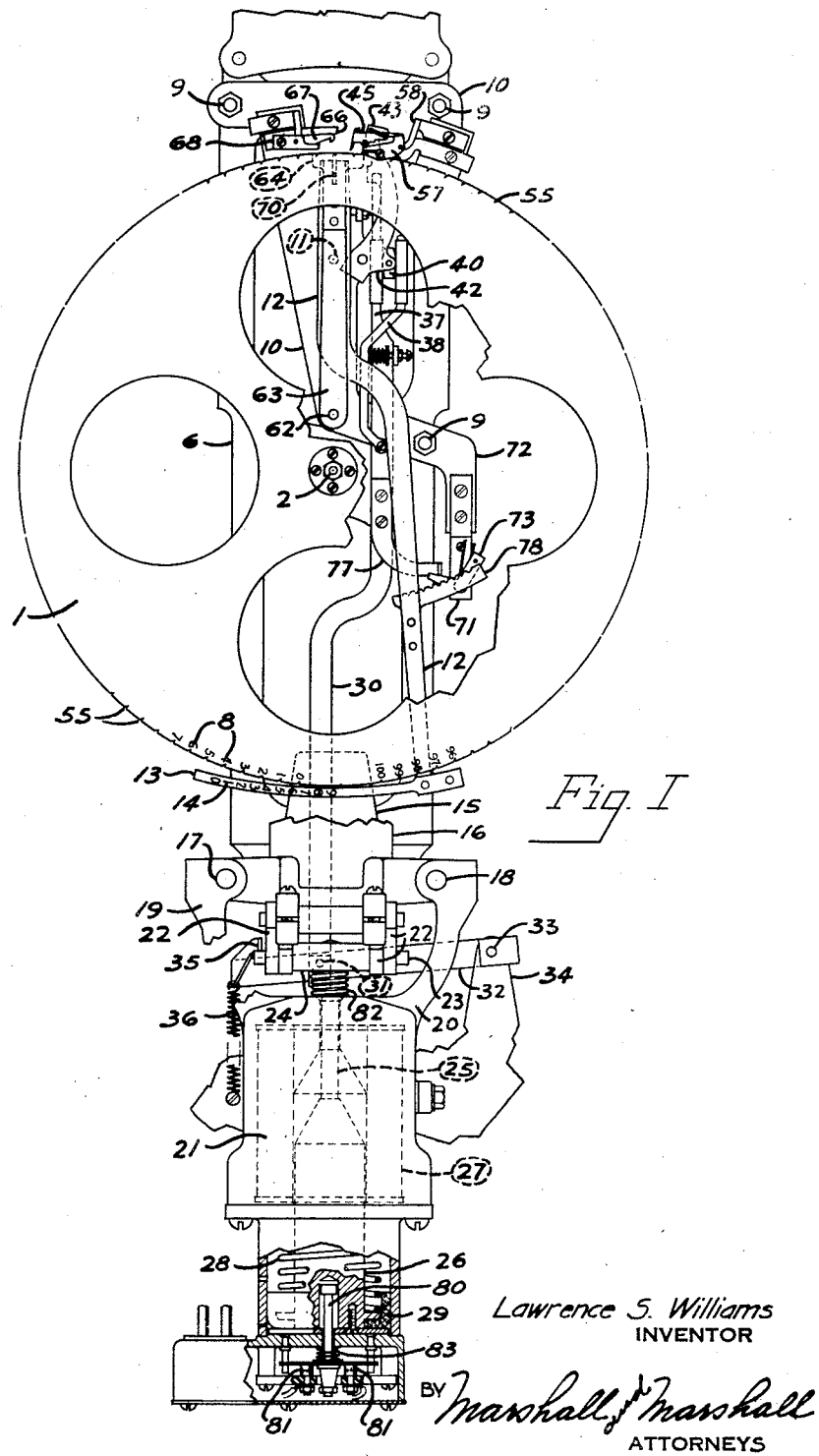

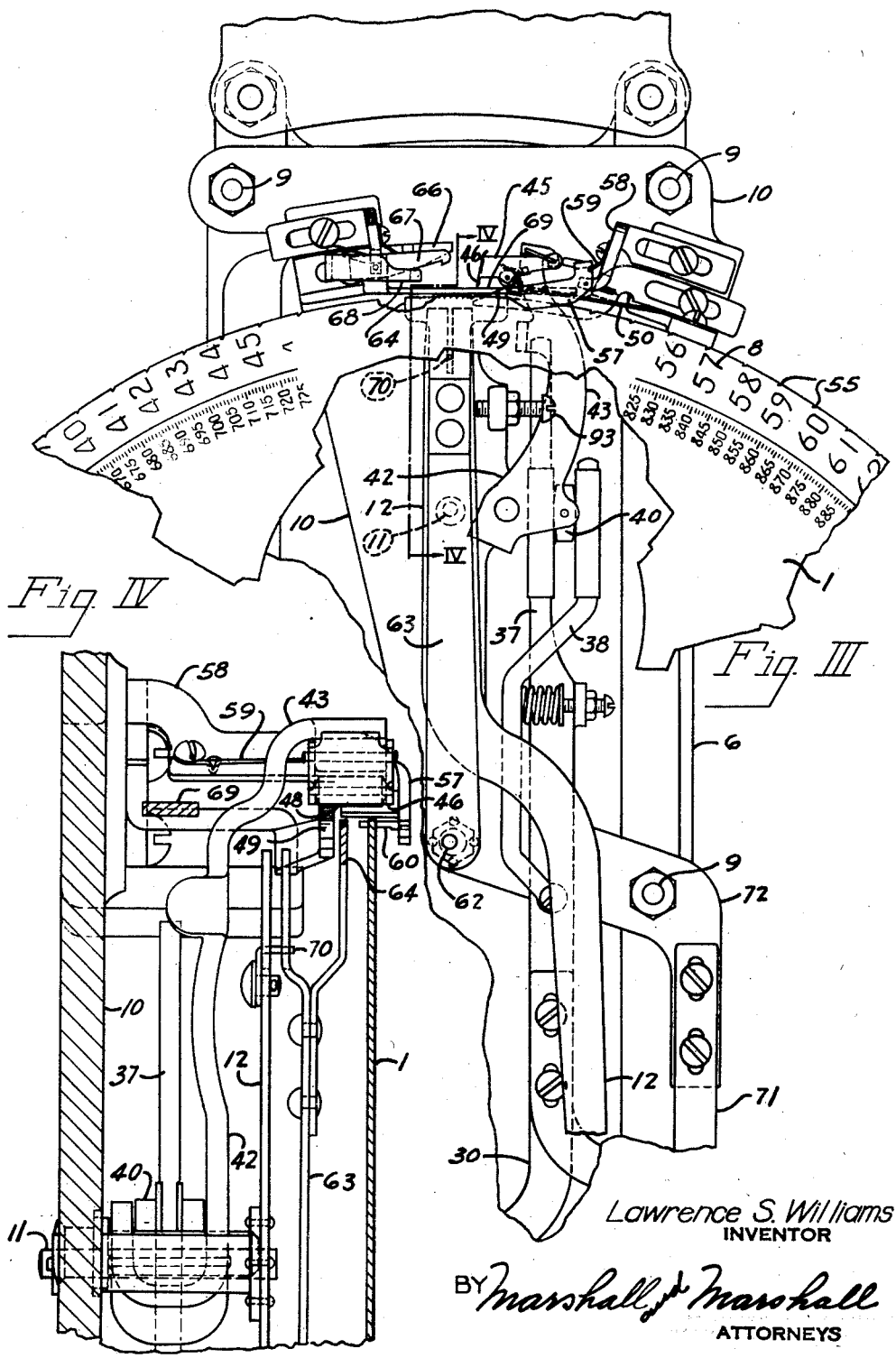

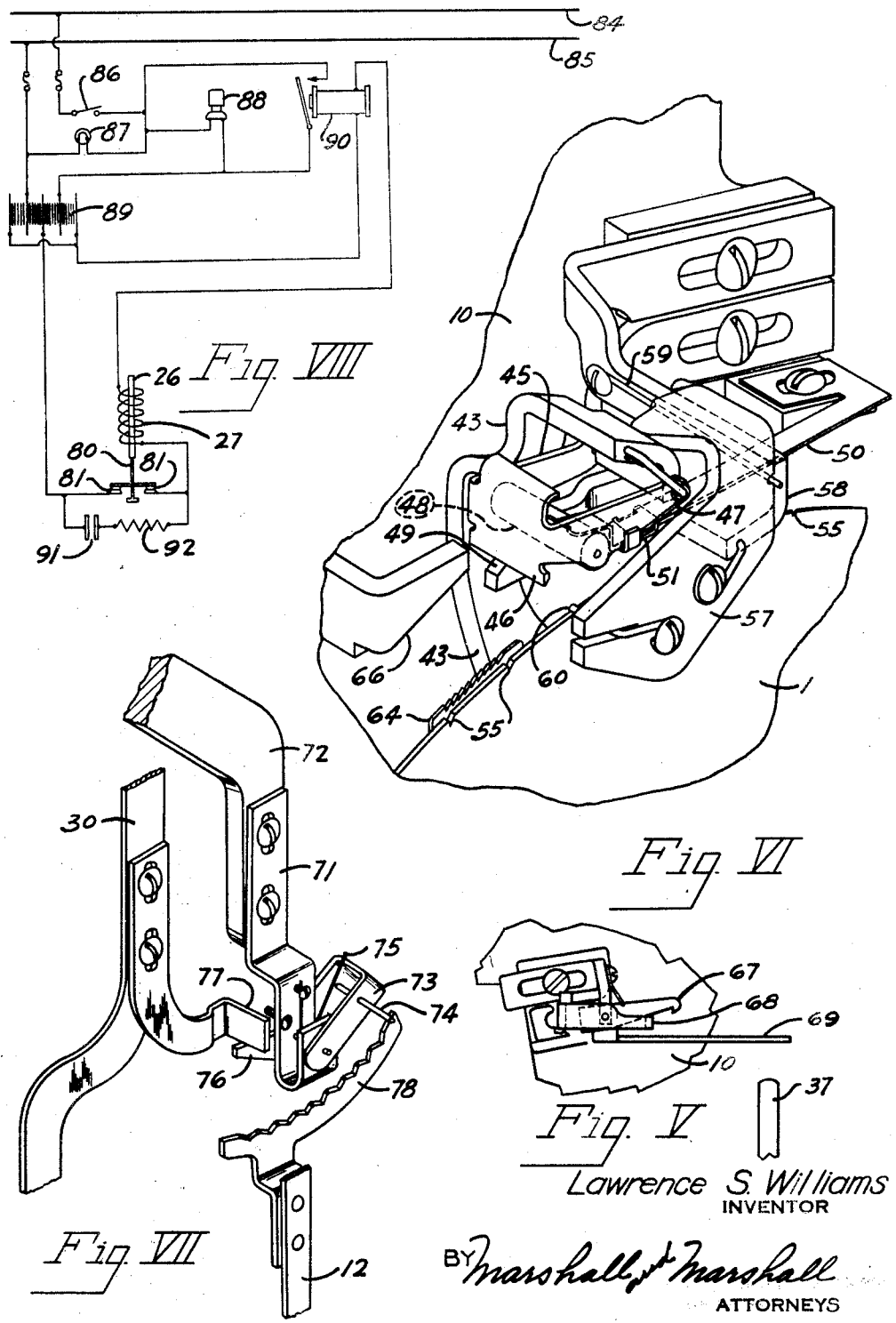

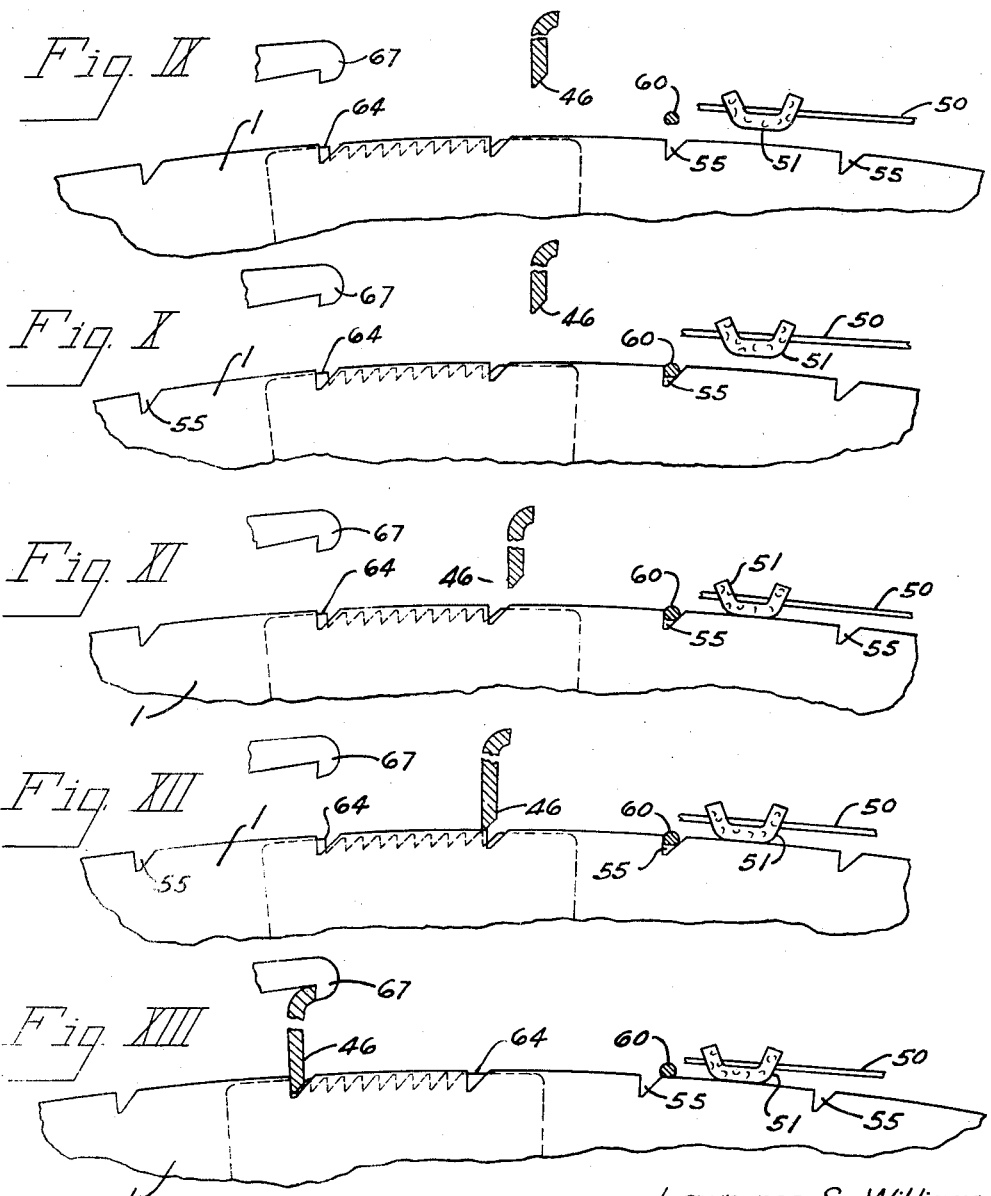

Patented July 7, 1942

2,288,761

UNITED STATES PATENT OFFICE 2,288,761

PRINTING SCALE

Lawrence S. Williams, Toledo, Ohio, assignor to Toledo Scale Company, a corporation of New Jersey Application June 1, 1938, Serial No. 211,221

8 Claims. (Cl. 234—5.4)

In automatic weighing and printing scales it is important that the inertia of parts moved by the automatic weighing mechanism and the momentum developed by movement of such parts be small; otherwise the time required to start the movement and stop the oscillations is liable to be too great for satisfactory operation. For this reason, thin, light disks have been utilized as type-carrying members. In general, the smaller the disk the quicker and more accurate will be the action of the scale. It is desirable that the diameter of the disk be not greater than twelve inches. On the other hand, it is highly desirable under many conditions that a printing scale be capable of printing one thousand different values, and that it be capable of printing each of those values in figures large enough to be easily readible. If, for example, the capacity of the printing scale be 1000 pounds, it is desirable that it be capable of printing such values as 550 pounds, 551 pounds, 552 pounds, etc. But type for printing each of one thousand values in figures $\frac{3}{16}$ inch in height would occupy the perimeter of a wheel more than five feet in diameter. It is an object of this invention to provide a printing scale having a type-carrying member of small dimensions to be moved by automatic weighing mechanism but which is nevertheless capable of printing in large figures many times the number of values that could be printed only from the type carried by the member moved by the automatic weighing mechanism.

In printing scales having type-carrying members that are set up by auxiliary mechanism after the weighing mechanism of the scale has come to rest and before the printing impression is made, the time elapsing between the application of the load to the scale exceeds that which is allowable where loads arrive at the scale in rapid succession. It is an object of my invention to provide a printing weighing scale having auxiliary typesetting mechanism which acts without appreciably delaying the printing cycle.

A general object is the provision of a printing scale capable of speedily setting up type for printing records in large characters.

Another object is the provision of a printing scale for printing records in large characters in which the inertia and extent of movement of the type-bearing members is minimized.

Another object is the provision of a printing weighing scale having a type-carrying member which is moved approximately into printing position by the motion of the weighing mechanism and having another type-carrying member which is moved into printing position by the action of auxiliary mechanism.

And still another object of the invention is the provision of a printing scale having a member carrying type for printing major digits, which printing member is moved approximately into printing position by the weighing mechanism and subsequently moved into exact printing position by auxiliary mechanism, the printing scale also having a member carrying type for printing minor digits which is moved into printing position by such auxiliary mechanism.

Other objects and advantages will be apparent from the following description, in which reference is had to the accompanying drawings illustrating a preferred embodiment of my invention and wherein similar reference numerals designate similar parts throughout the several views.

In the drawings:

Figure I is a front elevational view showing the printing mechanism of my invention;

Figure II is a side elevational view thereof, parts of the frame and casing being shown in section, and parts being broken away;

Figure III is an enlarged fragmentary front elevational view showing details of the mechanism illustrated in Figure I;

Figure IV is an enlarged fragmentary sectional view on the line IV—IV of Figure III;

Figure V is an enlarged fragmentary front elevational view of some of the parts shown in Figure III;

Figure VI is an enlarged fragmentary perspective view showing details of some of the mechanism illustrated in Figures III and IV;

Figure VII is an enlarged view in perspective showing the relationship of some of the parts illustrated in Figure I;

Figure VIII is a diagram of the circuits employed for the operation of the printing mechanism; and Figures IX, X, XI, XII and XIII are enlarged fragmentary views showing successive positions of selector mechanism employed in the device of my invention.

Referring to the drawings in detail, the printing device includes a disk 1 of thin metal which is fixed upon a shaft 2 that is turned preferably by means of a pinion 3 and a rack 4 operated from the automatic load-counterbalancing mechanism (not shown) of a weighing scale. The shaft 2 may advantageously be journaled, by means of bearings 5, in a frame 6 which supports the load-counterbalancing mechanism of the scale, and may, if desired, carry a pointer 7 for visual indication. The connection of the disk 1 to the weighing mechanism in any case is such that, when a load is weighed, the disk 1 rotates through an angle proportional to the weight of the load. Carried upon the face of the disk 1 are raised figures or type 8 to print the tens and hundreds digits of weight values.

Secured to the frame by means of bolts 9 is a sub-frame 10, and pivoted, as at 11, upon the sub-frame 10 is a depending arm 12 which carries at its lower end an arcuate strip 13 upon which is a series of raised figures or type 14 for printing units digits of weight values. The metal of the strip 13 and the metal of the disk 1 are of the same thickness, and when an impression is to be taken from the type 8 and 14, the disk and strip, together with an inking ribbon R and the paper P to be printed, are squeezed between an abutment 15 and platen 16. The mechanism which forces the abutment and platen together is like that illustrated and fully described in my United States Patent No. 2,013,940, issued September 10, 1935, the abutment and platen being mounted on rods 17 and 18 which are securely fastened to brackets 19 and 20 that are integral with a solenoid housing 21. The inking ribbon and feeding mechanism may be of any preferred kind and such mechanisms being well known, no description thereof is included in this specification.

The abutment and platen are connected by toggle links 22 which, by means of a pintle 23, are pivoted together and to a crosshead 24, the crosshead being fixed to an extension 25 of a solenoid core 26 mounted for vertical reciprocation within a solenoid 27 stationed within the solenoid housing 21. The solenoid core 26 is normally yieldably held in its lowermost position by a coil spring 28, and the lower end of the solenoid housing 21 is in the form of a cylinder within which slides a closely fitting cup 29 of leather or other suitable material. When the solenoid core 26 moves upwardly under the influence of the solenoid, a partial vacuum is created below the cup 29 during the first part of the stroke so that the upward leap of the core is retarded. Air is bled into the chamber below the cup and allowed to escape from above the cup through small orifices.

A vertically movable bar 30 has its lower end pivoted, as at 31, to a lever 32 one end of which is fulcrumed at 33 to an immovable bracket 34, the other end of the lever having a laterally extending finger 35 which rests upon the pintle 23 by which the toggle links 22 are pivoted to the crosshead 24. The finger 35 is held against the pintle, and the lever 32 and vertically movable bar 30 are yieldably pulled downwardly by a retractile spring 36. The upper end of the vertically movable bar 30 is forked, one furcation 37 being rigid with the bar, the other furcation 38 being hinged, and the furcations 37 and 38 are resiliently pressed against the sides of a friction block 40 which is pivoted upon an approximately horizontally extending arm of a bell crank lever 42 fulcrumed upon the sub-frame 10 and having its other arm 43 extending upwardly to above the upper edge of the disk 1.

Pivoted to the upper end of the upwardly extending arm 43 of the bell crank lever 42 is a pawl 45 having a blade 46 at its end and being yieldably urged downwardly by a spring 47. The blade 46, when the vertically movable bar 30 is in its lowermost position and the bell crank lever is in the position in which it is shown in Figure III, is held away from the upper edge of the disk 1 by a roller 48 which rests upon a fixed incline 49. The roller 48 underlies the hooked end of a leaf spring 50 which carries a brake 51 of leather or other friction material.

When the solenoid 27 is energized its core moves upwardly, raising the crosshead 24, swinging the lever 32 about its fulcrum and lifting the vertically movable bar 30. The pressure of the furcations 37 and 38 at the upper end of the vertically movable bar 30 on the friction block 40 is great enough to swing the bell crank lever 42 and thus move the upwardly extending arm 43 to the left, causing the roller 48 to ride down the incline 49 and permit the leaf spring 50 to force the brake 51 into engagement with the upper edge of the disk 1. The pawl 45 being lightly urged downwardly by the spring 47, the blade 46 next engages the upper edge of the disk 1 and slides along the upper edge of the disk until it rides into one of a series of notches 55 that are cut in the edge of the disk 1. The shapes of the notches 55 are such that when the blade 46 rides into one of them it moves the disk in counterclockwise direction, dragging it under the brake 51, the braking action of which is very slight.

In order to prevent the edge of the blade 46 from initially striking and damaging the corner of one of the notches 55, a pre-selector pawl 57, pivoted on a fixed bracket 58 and yieldably urged downwardly by a flexible spring 59, is released at the beginning of movement of the upper end of the bell crank arm 43 and swings a light wire detent 60 downwardly against the upper edge of the disk 1. The light wire detent is so located that if one of the notches 55 is in position to have its corner struck by the edge of the blade 46, the light wire detent will move into an adjacent notch 55 and by cam action move the disk 1 slightly so that the edge of the knife 46 will land beyond the corner of the notch, in the manner indicated in Figures X, XI and XII. The edge of the blade 46 will then slide along the upper edge of the disk 1 until it rides into the next notch, whereupon it will move the disk counterclockwise and the light wire detent 60 will be forced out of its notch by cam-like action.

Pivoted by means of a pin 62 to the sub-frame 10, and frictionally held against free vibration by the pressure of a spring surrounding the pin, is a ratchet lever 63, to the upper end of which is secured a ratchet sector 64 which lies behind and just within the circumference of the disk 1. While the blade 46 is sliding along the edge of the disk 1 it is held by the disk with its edge out of engagement with the teeth of the ratchet sector 64, but when it rides into one of the notches 55 its edge also drops into engagement with one of the teeth of the ratchet sector 64. Thereupon it moves the disk and the ratchet sector together in a counterclockwise direction until it is stopped by engagement with the sloping underside of a jam bracket 66. The jam bracket is so located that the disk will be stopped with one of the raised type values in proper position for printing. When thus stopped, the pawl 45 is prevented from bouncing back by a latch 67 which snaps over the upper edge of the blade 46. The latch 67 is capable of being lifted by a latch lifter 68 having a horizontal extension 69 which projects above the upper end of the rigid furcation 37 of the vertically movable bar 30, but the latch lifter does not act on the latch until after all tendency to bounce back has died out of the latch-held parts.

The ratchet lever 63 is connected at 70 to the depending arm 12 which carries the arcuate strip 13. The ratchet lever 63 and depending arm 12 are so proportioned and the relative spacings of the teeth of the ratchet sector 64, the type 14, and the notches 55 are such that if the edge of the blade falls into the ninth notch in the ratchet sector, i. e., the notch beyond the last or leftmost tooth, the arcuate strip will be moved to carry the type into position to print the units digit 9; if the edge of the blade falls into the eighth notch, the arcuate strip will be moved to carry the type into position to print the units digits 8, etc. The further beyond an even tens value the disk has been turned by the weighing mechanism, the less it will need be turned by the blade 46. Consequently, the further beyond an even tens value the weighing mechanism has turned the disk, the higher the units value to be recorded. If the blade were to move the disk through an angle substantially equal to the angular distance between adjacent notches 55, a 0 units digit would be printed from the type at the left end of the arcuate strip.

Supported by means of a bracket 71 on a downwardly extending portion 72 of the frame 10 is a pawl 73 having a wire detent 74, the pawl being urged downwardly by a spring 75. The pawl 73 has an integral tail 76 underlying a finger 77 that is fixed to the bar 30. Underlying the wire detent 74 is a centering quadrant 78 which is fixed to the arm 12 and is provided with a notch for each of the type 14 on the arcuate strip 13. During the part of the upward movement of the bar 30 which occurs prior to stoppage of movement of the bell crank lever 42, by the jamming of the blade 46 between the jam bracket 66 and the disk 1, the finger 77 presses upon the tail 76 and prevents the pawl 73 from swinging downwardly far enough to engage the wire detent 74 with the centering quadrant 78. When the movement of the bell crang lever 42 and the parts operated thereby is stopped, by jamming of the blade 46 between the jam bracket 66 and the disk 1, the resiliently pressed furcations at the upper end of the vertically sliding bar 30 slip over the friction block 40. Hence, the finger 77 continues to move upwardly, thus permitting the wire detent 74 to engage in the proper notch in the centering quadrant 78 and move the type corresponding to that notch into exact printing position. Engagement of the wire detent in one of the notches of the centering quadrant also prevents bouncing and quiets vibration of the arm 12 and type-carrying strip 13.

After the finger 77 leaves the tail 76 of the pawl 73 the solenoid armature 26 continues its upward stroke and presses the abutment 15 and platen 16 toward each other, thereby squeezing the paper to be printed, the inking ribbon and the type of the disk 1 and the strip 13 together, the resiliently pressed furcations at the upper end of the bar 30 continuing to slip over the friction block 40. The upper end of the rigid furcation 37 of the vertically movable bar 30 finally reaches the horizontal extension 69 of the latch lifter 68, and the latch 67 is lifted from the blade 46.

As the solenoid armature 26 reaches the top of its stroke, it lifts a bolt 80, connected to contacts 81, and breaks the solenoid energizing circuit. Thereupon the spring 28 forces the solenoid armature down to its initial position. A spring 82 cushions the shock of the return and a spring 83 again closes the contacts 81.

In order that the solenoid 27 be not re-energized when the contacts 81 are closed at the end of the return stroke of the solenoid armature 26, the circuits diagrammed in Figure VIII are employed. Current is taken from A. C. power lines 84—85 through a main switch 86. A lamp 87 indicates when the main switch is closed. From the main switch 86, current passes through a push-button switch 88 to a rectifier 89, and thence through the contacts 81 to the solenoid 27. Wired in series with the solenoid 27 is a magnetic relay 90. The push-button switch 88 is of the transitory type, which remains closed only momentarily when the button is pressed, even though the user continue to hold the button down. Operation of the relay 90 shunts the current around the push-button switch, however, so that the current continues to energize the solenoid 27 and the relay 90 after the opening of the push-button switch, until the contacts 81 are opened at the end of the printing cycle. Arcing at the contacts 81 is minimized by the action of a condenser 91 and resistance 92 wired in parallel with the contacts.

As is apparent in Figures III, VI and VII, the incline 49, the brake-carrying spring 50, the pre-selector pawl 57, the jam brake 66, the finger 77, and the pawl 73, all are mounted by means of slots and clamping screws so that they may be adjusted to come into operation in proper sequence and at proper intervals.

The sequence of operations is as follows: The main switch 86 being closed and the inking ribbon R and paper P to be printed being in place between the platen 16 and the type on the disk 1 and the arcuate strip 13, a load is applied to the weighing scale. The disk 1 rotates to a position corresponding to the weight of the load. The user then closes the transitory push-button switch 88, thus energizing the relay 90 and solenoid 27 and causing the solenoid armature to move upwardly. During approximately the first 40% of the upward movement of the solenoid armature and vertically sliding bar 30 (the violence of the movement being mitigated by the partial vacuum below the leather cup 29), the resiliently pressed furcations at the upper end of the bar 30 carry with them the friction block 40, thereby rocking the bell crank arm 43 to the left.

Initial movement of the bell crank arm 43 permits the pre-selector pawl 57 to lower the light wire detent 60 upon the edge of the disk 1. If the detent 60 drops into a notch 55 it may move the disk slightly to prevent damage to the corner of the adjacent notch, but the detent is so flexible that it will not interfere with subsequent movement of the disk, whether or not it drops into a notch. Further movement of the bell crank arm 43 moves the roller 48 from beneath the leaf spring 50 and permits the spring to press the brake 51 against the edge of the disk 1. Then the edge of the blade 46 engages the edge of the disk 1 and slides counterclockwise along the edge of the disk until it rides into a notch 55, and at the same time engages a tooth of the ratchet sector 64 and pushes the disk and ratchet sector counterclockwise together until the blade is jammed between the jam bracket 66 and the disk 1 and the latch 67 snaps over the blade.

The bell crank lever 42 being thus held against movement, the resiliently pressed furcations at the upper end of the bar 30 slip over the friction block 40, the finger 77 continues to rise and the wire detent 74 is lowered into a notch of the centering quadrant 78.

The remaining 60% of the movement of the solenoid armature 26 presses the abutment 15 against the disk 1 and strip 13, and the platen 16 against the inking ribbon and paper, thus squeezing the type, ribbon and paper together and making the required impression, the latch 67 being lifted during the last part of the printing action.

At the top of the armature stroke the solenoid 27 is deenergized. The armature then moves downwardly under the influence of the spring 28, the vertically movable bar 30 being pulled down with the armature by the retractile spring 36. During the first 40% of the downward movement of the vertically movable bar 30, the resiliently pressed furcations at its upper end pull the friction block 40 with them, so that the backward movement is transmitted through the bell crank arm 43 to move the blade from beneath the latch 67 and to restore the blade 46, the brake 51 and the light wire detent 60 to their first positions.

When the bell crank has reached the limit of its backward movement the resiliently pressed furcations at the top of the vertically movable bar 30 slide downwardly over the friction block 40 and the finger 77 again raises the wire detent 74 from the centering quadrant 78. The type-carrying members having meanwhile been relieved of the squeeze between the abutment 15 and the platen 16, the arm 12 and the type-carrying strip 13 are freed to resume the starting position in which they are shown in Figure I. This starting position may be adjusted by means of a stop screw 93 to bring the teeth of the ratchet sector into correct initial locations. Since the electrical circuits have been restored to their original condition by opening of the contacts 81, the device is ready for another sequence of operations.

With the device of my invention, using a ten-inch disk and a three-inch arcuate strip, it is possible, and practicable, to print a thousand values in characters as large as could be printed from the perimeter of a disk having a diameter of one hundred inches. The movement of the light strip being small, it is whipped into place as the platen and abutment begin to move to make the imprint, and the whole printing cycle is completed in a fraction of a second.

The embodiment of my invention herein shown and described is to be regarded as illustrative only, and it is to be understood that the invention is susceptible to variation, modification and change within the spirit and scope of the subjoined claims.

Having described my invention, I claim:

1. In a printing scale, in combination, a disk adapted to be turned by automatic weighing mechanism and bearing type for printing the tens digits in weight values, said disk having a series of equally spaced notches in its periphery, a pawl, means for moving said pawl through a fixed path along the edge of said disk, said pawl being engageable during such movement in that one of said notches positioned adjacent such path by the weight of the load on said scale, a movable sector having teeth engageable by said pawl upon engagement of said pawl in such notch, a stationary member for limiting the movement of said pawl after engagement with such notch and one of said teeth, a type-bearing member for printing the units digits in weight values, said member lying adjacent the periphery of said disk, and motion multiplying means connecting said type-bearing member to said movable sector for moving said type-bearing member proportionately to the movement of said movable sector, said stationary member limiting the movement of said pawl and said disk movable thereby to position said disk with that one of such type corresponding to the tens digits of the weight value of the load on said scale in position to be printed and to position said movable sector and said type-bearing member connected thereto to align that one of the type borne by said movable member corresponding to the units digit of the weight of the load on said scale in alignment with such type borne by said disk.

2. In a printing scale, in combination, a disk adapted to be turned by automatic weighing mechanism and bearing a series of angularly spaced type for printing figures of a high order in weight values, said disk having a series of angularly spaced notches corresponding to said type in its edge, the angular spacing of said type and said notches being equivalent, a pawl movable along the edge of said disk and engageable with that one of said notches corresponding to that portion of the weight of the load on said scale represented by the corresponding one of the figures borne by said disk, a sector having teeth engageable by said pawl only when said pawl is engaged with one of said notches, a member bearing a series of type to print figures of a low order in weight values, such figures corresponding to the teeth in said sector, motion multiplying means connecting said member and said sector, means for moving said pawl along the edge of said disk to engage said pawl with one of said notches and with one of said teeth in said sector and thereafter to move said disk and said sector, and a stationary member for stopping such movement of said pawl and of said disk and said sector and said member connected thereto, with the type borne by said member, corresponding to that one of said teeth in which said pawl is engaged, in alignment with the type borne by said disk corresponding to that one of said notches in which said pawl is engaged and with both the type borne by said member and said disk in position for printing.

3. In a weighing scale, in combination, a load-responsive member bearing equally spaced numbers corresponding to tens digits in weight values, said load-responsive member having a series of notches along the edge thereof, the spacing of said notches corresponding to the spacing of the numbers borne by said load-responsive member, an auxiliary number-bearing member bearing numbers corresponding to the units digits of weight values and lying adjacent the numbers borne by said load-responsive member, an auxiliary notched member having a series of closely spaced notches lying adjacent the edge of said load-responsive member, motion multiplying means connecting said auxiliary notched member and said auxiliary number-bearing member, a pawl, means for moving said pawl along the edge of said load-responsive member, said pawl being engageable during such movement in one of the notches in said edge, such engagement in one of the notches in said edge leading said pawl to engage also in a selected one of the notches of said auxiliary notched member whereby further movement of said pawl causes corresponding movement together of said load-responsive member and said auxiliary notched member and multiplied movement of said auxiliary number-bearing member, and means defining the limit of movement of said pawl for stopping the movement of said load-responsive member and said auxiliary number-bearing member with the numbers borne by said load-responsive member and said auxiliary number-bearing member in alignment and in position to indicate the weight of any load to which said load-responsive member has responded.

4. In a weighing scale, in combination, a load-responsive disk bearing equally spaced figures corresponding to tens digits in weight values, said load-responsive disk having a series of notches along the edge thereof, the spacing of said notches corresponding to the spacing of the numbers borne by said load-responsive disk, an auxiliary number-bearing member bearing numbers corresponding to the units digit of weight values and lying adjacent the numbers borne by said load-responsive disk, an auxiliary notched member having a series of closely spaced notches lying adjacent the edge of said load-responsive disk, motion multiplying means connecting said auxiliary notched member and said auxiliary number-bearing member, a pawl, means for moving said pawl along the edge of said load-responsive disk, said pawl being engageable during such movement in one of the notches in said edge, such engagement in one of the notches in said edge leading said pawl to engage also in a selected one of the notches of said auxiliary notched member whereby further movement of said pawl causes corresponding movement together of said load-responsive disk and said auxiliary notched member and multiplied movement of said auxiliary number-bearing member, and means defining the limit of movement of said pawl for stopping the movement of said load-responsive disk and said auxiliary number-bearing member in alignment and in position to indicate the weight of any load to which said load-responsive disk has responded.

5. In a weighing scale, in combination, a load-responsive member bearing equally spaced numbers corresponding to tens digits in weight values, said load-responsive member having a series of notches along the edge thereof, the spacing of said notches corresponding to the spacing of the numbers borne by said load-responsive member, an arcuate number-bearing strip bearing numbers corresponding to the units digits of weight values and lying adjacent the numbers borne by said load-responsive member, an auxiliary notched sector having a series of spaced notches corresponding to the members borne by said arcuate number-bearing strip and lying adjacent the edge of said load-responsive member, motion multiplying means connecting said auxiliary notched sector and said arcuate number-bearing strip, a pawl, means for moving said pawl along the edge of said load-responsive member, said pawl being engageable during such movement in one of the notches in said edge, such engagement in one of the notches in said edge leading said pawl to engage also in a selected one of the notches of said auxiliary notched sector whereby further movement of said pawl causes corresponding movement together of said load-responsive member and said auxiliary notched sector and multiplied movement of said arcuate number-bearing strip, and means defining the limit of movement of said pawl for stopping the movement of said load-responsive member and said arcuate number-bearing strip with the numbers borne by said load-responsive member and said arcuate number-bearing strip in alignment and in position to indicate the weight of any load to which said load-responsive member has responded.

6. In a weighing scale, in combination, a load-responsive disk bearing equally spaced numbers corresponding to tens digits in weight values, said load-responsive disk having a series of notches along the edge thereof, the spacing of said notches corresponding to the spacing of the numbers borne by said load-responsive disk, an arcuate number-bearing strip bearing numbers corresponding to the units digits of weight values and lying adjacent the numbers borne by said load-responsive disk, a notched sector having a series of closely spaced notches lying adjacent the edge of said load-responsive disk, motion multiplying means connecting said notched sector and said arcuate number-bearing strip, a pawl, means for moving said pawl along the edge of said load-responsive disk, said pawl being engageable during such movement in one of the notches in said edge, such engagement in one of the notches in said edge leading said pawl to engage also in a selected one of the notches of said notched sector whereby further movement of said pawl causes corresponding movement together of said load-responsive disk and said notched sector and multiplied movement of said arcuate number-bearing strip, and means defining the limit of movement of said pawl for stopping the movement of said load-responsive disk and said arcuate number-bearing strip with the numbers borne by said load-responsive disk and said arcuate number-bearing strip in alignment and in position to indicate the weight of any load to which said load-responsive disk has responded.

7. In a weighing scale, in combination, a load-responsive member having equally spaced numbers corresponding to major divisions of weight values, said load responsive member having a series of notches along the edge thereof, the spacing of said notches corresponding to the spacing of the numbers borne by said load-responsive member, an auxiliary number-bearing member bearing numbers corresponding to minor divisions of such major divisions of weight and lying adjacent the numbers borne by said load-responsive member, an auxiliary member having a series of closely spaced teeth lying adjacent the edge of said load-responsive member, said teeth corresponding and being spaced proportionately to the numbers borne by said auxiliary number-bearing member, motion multiplying means connecting said auxiliary member to said auxiliary number-bearing member, a pawl, means for moving said pawl along the edge of said load-responsive member, said pawl being engageable during such movement in that one of the notches in the edge of said load-responsive member corresponding to the major divisions of the weight of the load on said scale, such notch being so located under such load as to guide said pawl into engagement with that one of the teeth in said auxiliary member corresponding to the minor divisions of weight of the load on said scale, whereby further movement of said pawl causes corresponding movement together of said load-responsive member and said auxiliary member and multiplied movement of said auxiliary number-bearing member, a preselector adapted to contact said load-responsive member just prior to the engagement of said pawl in the correctly positioned one of said notches to preposition said load-responsive member, in the event that the load on said scale is such that the notch corresponding to the correct major division of weight is so positioned as to be engaged on its sharp edge by said pawl, for insuring engagement of said pawl in such notch and not on such edge, and means for stopping the movement of said load-responsive member and said auxiliary number-bearing member in alignment and in position to indicate the weight of any load to which said load-responsive member has responded.

8. In a printing weighing scale, in combination, a load-responsive disk having equally spaced numbers corresponding to major divisions of weight values, said load-responsive disk having a series of notches along the edge thereof, the spacing of said notches corresponding to the spacing of the numbers borne by said load-responsive disk, an arcuate number-bearing strip bearing numbers corresponding to minor divisions of such major divisions of weight and lying adjacent the numbers borne by said load-responsive disk, a sector having a series of closely spaced teeth lying adjacent the edge of said load-responsive disk, said teeth corresponding and being spaced proportionately to the numbers borne by said arcuate number-bearing strip, motion multiplying linkage connecting said sector to said arcuate member-bearing strip, a pawl, means for moving said pawl on the edge of said load-responsive disk, said pawl being engageable during such movement in that one of the notches in the edge of said load-responsive disk corresponding to the major divisions of the weight of the load on said scale, such notch being so located under such load as to guide said pawl into engagement with that one of the teeth in said sector corresponding to the minor divisions of weight of the load on said scale whereby further movement of said pawl causes corresponding movement together of said load-responsive disk and said sector and multiplied movement of said arcuate number-bearing strip, a preselecting detent adapted to contact said load-responsive disk just prior to the engagement of said pawl in the selected one of said notches to preposition said load-responsive disk, in the event that the load on said scale is such that the notch corresponding to the correct major division of weight is so positioned as to be engaged on its sharp edge by said pawl, for insuring engagement of said pawl in such notch and not on such edge, and an adjustable stop for limiting the movement of said load-responsive disk and said arcuate number-bearing strip in alignment and in a position to correctly indicate the weight of any load to which said load-responsive disk has responded.

LAWRENCE S. WILLIAMS.